(12) United States Patent (10) Patent No.: US 12,651,782 B2

LaRocco (45) Date of Patent: Jun. 9, 2026

(54) HYGROELECTRIC CHARGING AND BATTERY MANAGEMENT SYSTEM

(71) Applicant: John LaRocco, Columbus, OH (US)

(72) Inventor: John LaRocco, Columbus, OH (US)

( * ) Notice: Subject to any disclaimer, the term of this patent is extended or adjusted under 35 U.S.C. 154(b) by 590 days.

(21) Appl. No.: 18/219,682

(22) Filed: Jul. 9, 2023

(65) Prior Publication Data

US 2024/0339685 A1 Oct. 10, 2024

Related U.S. Application Data

(60) Provisional application No. 63/494,844, filed on Apr. 7, 2023.

(51) Int. Cl.
H01M 10/46 (2006.01)
B64U 50/30 (2023.01)
(Continued)

(52) U.S. Cl.
CPC ............ H01M 10/46 (2013.01); B64U 50/30 (2023.01); C08L 25/04 (2013.01); C08L 29/04 (2013.01); C08L 39/00 (2013.01); H01M 10/425 (2013.01); H02J 7/40 (2026.01); H02J 7/70 (2026.01); H02J 7/82 (2026.01); H02J 7/927 (2026.01); B64U 10/14 (2023.01); C08L 2203/20 (2013.01); H01M 2010/4271 (2013.01); H01M 2220/20 (2013.01)

(58) Field of Classification Search
CPC ............... H01M 10/46; H01M 10/425; H01M 2010/4271; H01M 2220/20; B64U 50/30;

B64U 10/14; C08L 25/04; C08L 29/04; C08L 39/00; C08L 2203/20; C08L 25/18; H02J 7/40; H02J 7/70; H02J 7/82; H02J 7/927; C08F 126/02
See application file for complete search history.

(56) References Cited

U.S. PATENT DOCUMENTS

| | | | |
|---|---|---|---|
| 2012/0329354 A1* | 12/2012 | Afshari | B32B 5/24 |
| | | | 442/398 |
| 2024/0396122 A1* | 11/2024 | Tanabe | B60N 2/16 |

OTHER PUBLICATIONS

L. H. Saw, Y. Yeand A. A. Tay, "Integration issues of lithium-ion battery into electric vehicles battery pack," J. Cleaner Prod., 2016, 113, 1, 1032-1045.

(Continued)

*Primary Examiner* — Jamara A Franklin

(74) *Attorney, Agent, or Firm* — Helix Patent Services, LLC

(57) ABSTRACT

The invention provides a hygroelectric charging and power management system. The system comprises at least one single layer or a bilayer of flexible hygroelectric polymer stacked together in series to generate power on collision with a water molecule, and at least one rechargeable battery having an input terminal and an output terminal. The input terminal is electrically connected to the single layer or the bilayer of flexible hygroelectric polymer to receive and store the generated power. The system further comprises at least one charger module to modulate between the single layer or the bilayer of flexible hygroelectric polymer and the rechargeable battery. The system applies Pulse Width Modulation (PWM) on the charger module to balance real-time recharging of the battery and to ensure constant power supply to a device under active load.

14 Claims, 2 Drawing Sheets

(51) Int. Cl.

| | |
|---|---|
| *C08L 25/04* | (2006.01) |
| *C08L 29/04* | (2006.01) |
| *C08L 39/00* | (2006.01) |
| *H01M 10/42* | (2006.01) |
| *H02J 7/40* | (2026.01) |
| *H02J 7/70* | (2026.01) |
| *H02J 7/82* | (2026.01) |
| *H02J 7/90* | (2026.01) |
| *B64U 10/14* | (2023.01) |

(56) References Cited

OTHER PUBLICATIONS

H. Wang, Y. Sun, T. He, Y. Huang, H. Cheng, C. Li, D. Xie, P. Yant, Y. Zhang and L. Qu, "Bilayer of polyelectrolyte films for spontaneous power generation in air up to an integrated 1,000 V output," Nat. Nanotechnol., 2021, 16, 7, 811-819.

C. S. Goh, J. R. Kuan, J. H. Yeo, B. S. Teo and A. Danner, "A fully solar-powered quadcopter able to achieve controlled flight out of the ground effect," Prog. Photovolt., 2019, 27, 10, 869-878.

H. Xu, Y. He, K. Strobel, C. Gilmore, S. Kelley, C. Hennick, T. Sebastian, M. Woolston, D. Perreault, and S. Barrett, "Flight of an aeroplane with solid-state propulsion," Nature, 2018, 563, 7732, 532-535.

* cited by examiner

HYGROELECTRIC CHARGING AND BATTERY MANAGEMENT SYSTEM

CROSS REFERENCE TO RELATED APPLICATIONS

This application claims the benefit of U.S. Provisional Application No. 63/494,844, filed Apr. 7, 2023, which is hereby incorporated by reference in its entirety.

FIELD OF THE INVENTION

The present invention relates generally to the production of electric power, and more particularly, to devices fabricated with hygroelectric polymers that generate electric power from ambient atmospheric moisture and methods of using such devices to generate continuous electric power.

BACKGROUND OF THE INVENTION

Hygroelectric material is present in nature, such as protein nanowires from the bacteria *Geobacter* (Lovley, et al., 2011; Kjeldsen, et al., 2019; Bjerg, et al., 2018; Fredrickson, et al., 2008). Graphene oxide was among the first synthetic, abiotic hygroelectric materials synthesized. Brazilian researchers have reported making a low-cost hygroelectric material from paper and graphite solution, and Australian researchers successfully tested hygroelectric cells from whey protein. These cells can be stacked in series and last for over 3 months of continuous power, even in variable humidity conditions. Prior work polymer cells were able to achieve 1000 V through folding single-element polymer electrodes. However, these were not combined with any sort of energy storage and charge management system.

WO2019144931A1 discloses a moisture power generator and a preparation method therefor. The moisture power generator comprises a substrate, a first electrode, a nanowire layer, and a second electrode arranged in sequence, wherein the nanowire layer is arranged between the first electrode and the second electrode and is formed from randomly distributed nanowires. The disclosed document further provides a preparation method for the above-mentioned moisture power generator. The moisture power generator provided by the present invention uses a network structure formed from the nanowires, wherein the structure has a good hydrophilicity, and wherein a large number of nanometer gaps contained therein can facilitate moisture diffusion, so that the moisture power generator can have a relatively high power output density. When the substrate of the moisture power generator is made of a flexible material, in combination with the nanowire layer network structure with a high flexibility, the moisture power generator also has good mechanical flexibility, and can act as a humidity sensor to detect the environmental humidity, and can also be pasted onto the skin of a human body to monitor the respiration state of the human body in real-time, or can act as a wearable electronic touch screen, and can also be used for driving an alcohol sensor.

WO2020069523A1 provides an electric power generation system. The electric power generation system includes an electric power generation device and an ambient environment comprising an atmospheric relative humidity of at least 20%. The electric power generation device includes a thin film of protein nanowires or a nanowire composite, the thin film having an opposing first surface and second surface. The electric power generation device also includes a first electrode and a second electrode, electrically connected to the first surface and second surface, respectively, of the thin film. At least one of the first surface and the second surface of the thin film is at least partially exposed to the ambient environment. A moisture gradient and charge gradient are therefore created and maintained in the thin film to continuously generate power.

WO2022119307A1 provides a humidity-responsive energy harvester. The humidity-responsive energy harvester may comprise a substrate structure comprising carbon fibers; a first harvesting structure disposed on the substrate structure and comprising a polymer with the concentration of hydrogen ions changed in response to humidity; and a second harvesting structure disposed on the first harvesting structure and comprising a carbon fiber coated with active materials including a composite of a transition metal and an oxide of the transition metal, wherein the polymer of the first harvesting structure has a changed concentration of hydrogen ions in response to humidity and thus causes a difference in redox reaction in the second harvesting structure, leading to energy generation.

Balancing the electrical loading of a system with inconsistent recharging requires real-time management of battery charge. Lithium batteries require discharge management in order to avoid dangerous thermal accumulation. With photovoltaics and wind turbines, batteries are constantly recharged by an inconsistent power supply. If the battery is being charged while under an electrical load, then managing the power coming in and being released requires a specialized system to maintain a constant voltage.

A technique used with photovoltaic systems is pulse-width modulation (PWM) with a battery charge management chip. To ensure constant energy to the load, PWM can rapidly switch incoming voltage sources, and it has been used for inertially-dynamic systems, like motors and power tools. The switching frequency varies with the device and application, but PWM devices are in widespread commercial and industrial use. For the variable output from a hygroelectric material, a PWM chip could manage a high-demand load.

Prior attempts at purely electric flight have involved multiple constraints, often related to the weight of power supplies. However, ionic propulsion was successfully used in a fixed-wing model aircraft, as well as with wholly electric vertical takeoff and landing (VTOL) aircraft. Notably, these aircrafts, such as quadcopter drones, have highly variable power consumption. Because the engines must lift the weight of the entire drone as it moves, the quadcopter's power demand is always nonzero. Additional objects on the drone can weigh it down further, requiring it be stripped to bare essentials. Researchers have previously demonstrated a photovoltaic-powered helicopter drone that used lightweight photovoltaic panels and a minimal frame. However, the drone only functioned on clear, sunny days. The VTOL of electric ionocraft initially required immense external power supplies, but recent developments in self-contained ion-powered craft have been capable of lifting their own power supply. Approaches relying on ground stations or sources that send power require costly infrastructure. Consequently, hygroelectric power may benefit all types of devices, even if only as a supplementary source.

Hygroelectric materials could potentially offer an improvement over sunlight-constrained photovoltaics. In humid and tropical environments, high humidity can be more consistent than clear sunlight. Photovoltaics also require rare earth metals to be mined and refined, producing toxic byproducts. Similarly, photovoltaic devices contain toxic metals that cannot be recycled. By contrast, hygroelectric materials are primarily composed of polymers that can be safely shredded, recycled, and disposed of. As flexible polymers, stacked hygroelectric cells have been used to power larger electronics, such as sensors and appliances.

Accordingly, in view of the above-mentioned drawbacks, there is a need for an improved hygroelectric charging and power management system.

SUMMARY OF THE INVENTION

To address the foregoing problems, in whole or in part, and/or other problems that may have been observed by persons skilled in the art, the present disclosure provides compositions and methods as described by way of example as set forth below.

A principal object of the invention is to provide an improved hygroelectric charging and power management system which addresses the above-mentioned drawbacks.

Another object of the invention is to provide a hygroelectric polymer for charging a battery system compatible with a charger module to balance real-time recharging of the battery system and active loading.

In an aspect of the present invention, there is provided an improved hygroelectric charging and power management system. The system comprises at least one single layer of flexible hygroelectric polymer stacked together in series to generate power on collision with a water molecule, and at least one rechargeable battery having an input terminal and an output terminal. The input terminal is electrically connected to the at least one single layer of flexible hygroelectric polymer to receive and store the generated power. The system further comprises at least one charger module to modulate between the at least one single layer of flexible hygroelectric polymer and the at least one rechargeable battery. The system applies Pulse Width Modulation (PWM) on the at least one charger module to balance real-time recharging of the at least one rechargeable battery and to ensure a constant power supply to a device under active load.

In another aspect of the present invention, there is provided an improved hygroelectric charging and power management system. The system comprises at least one bilayer of flexible hygroelectric polymer stacked together in series to generate power on collision with a water molecule, and at least one rechargeable battery having an input terminal and an output terminal. The input terminal is electrically connected to the at least one bilayer of flexible hygroelectric polymer to receive and store the generated power. The system further comprises at least one charger module to modulate between the at least one bilayer of flexible hygroelectric polymer and the at least one rechargeable battery. The system applies Pulse Width Modulation (PWM) on the at least one charger module to balance real-time recharging of the at least one rechargeable battery and to ensure a constant power supply to a device under active load.

Additional features of the invention will be or will become apparent to one with skill in the art upon examination of the following figures and detailed description. It is intended that all such additional features and advantages be included within this description, be within the scope of the invention, and be protected by the accompanying claims.

BRIEF DESCRIPTION OF THE DRAWINGS

Figure 1:
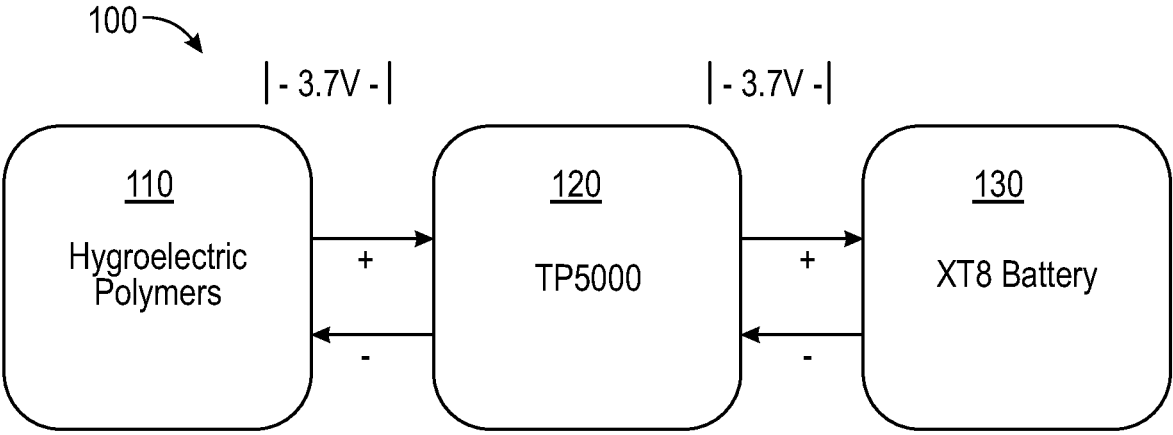
Figure 2A:
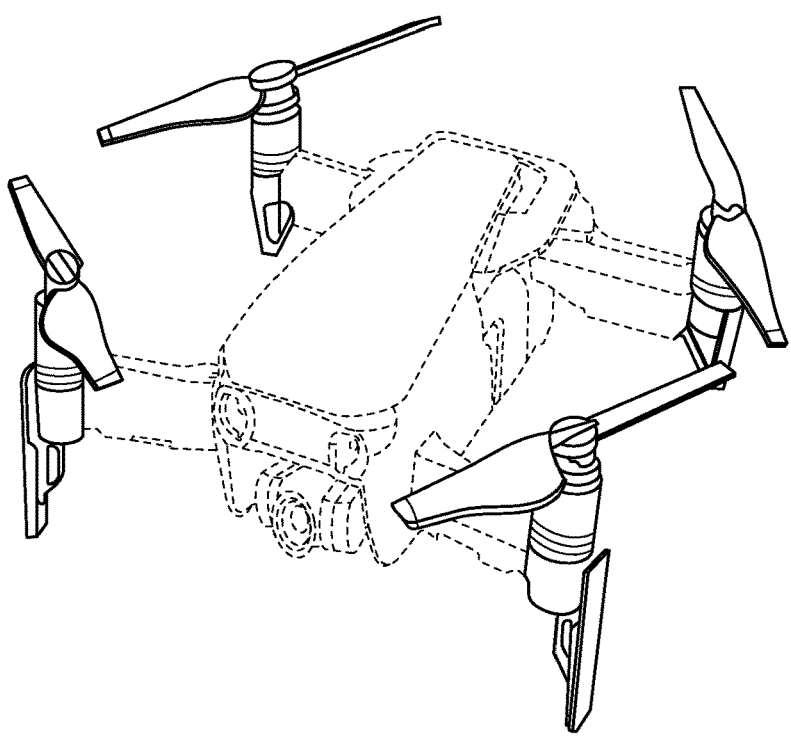
Figure 2B:
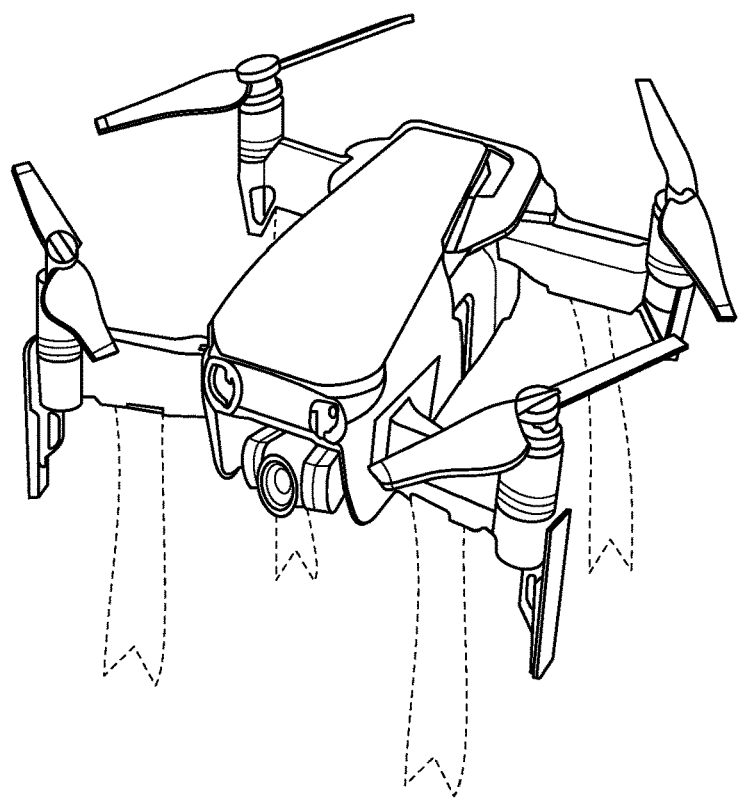

Having thus described the subject matter of the present invention in general terms, reference will now be made to the accompanying drawings, which are not necessarily drawn to scale, and wherein:

FIG. 1 illustrates a schematic view of the electrical wiring for hygroelectric charging and power management system, in accordance with an embodiment of the present invention; and FIGS. 2A and 2B illustrate schematic views of placements of hygroelectric material on a drone, in accordance with exemplary embodiments of the present invention.

Skilled artisans will appreciate that elements in the drawings are illustrated for simplicity and may not have necessarily been drawn to scale. Furthermore, in terms of the construction of the device, one or more components of the device may have been represented in the drawings by conventional symbols, and the drawings may show only those specific details that are pertinent to understanding the embodiments of the present invention so as not to obscure the drawings with details that will be readily apparent to those of ordinary skill in the art having the benefit of the description herein.

DETAILED DESCRIPTION OF THE INVENTION

The subject matter of the present invention now will be described more fully hereinafter with reference to the accompanying drawings, in which some, but not all embodiments of the subject matter of the present invention are shown. Like numbers refer to like elements throughout. The subject matter of the present invention may be embodied in many different forms and should not be construed as limited to the embodiments set forth herein; rather, these embodiments are provided so that this disclosure will satisfy applicable legal requirements. Indeed, many modifications and other embodiments of the subject matter of the present invention set forth herein will come to mind to one skilled in the art to which the subject matter of the present invention pertains having the benefit of the teachings presented in the foregoing descriptions and the associated drawings. All illustrations of the drawings are for the purpose of describing selected versions of the present invention and are not intended to limit the scope of the present invention. Therefore, it is to be understood that the subject matter of the present invention is not to be limited to the specific embodiments disclosed and that modifications and other embodiments are intended to be included within the scope of the appended claims.

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and example of the present disclosure and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Regarding applicability of 35 U.S.C. § 112, ¶6, no claim element is intended to be read in accordance with this statutory provision unless the explicit phrase "means for" or "step for" is actually used in such claim element, whereupon this statutory provision is intended to apply in the interpretation of such claim element.

Furthermore, it is important to note that, as used herein, "a" and "an" each generally denotes "at least one", but does not exclude a plurality unless the contextual use dictates otherwise. When used herein to join a list of items, "or" denotes "at least one of the items", but does not exclude a plurality of items of the list. Finally, when used herein to join a list of items, "and" denotes "all of the items of the list".

Great strides towards clean and affordable technology have been made in the alternative energy industry. Common alternative energy sources include solar energy, wind energy, and hydropower. One intriguing development in alternative energy, which has not drawn much attention, is the discovery of hygroelectric materials. Hygroelectric materials collect energy from moisture in the ambient environment. These materials generate power from ambient humidity when water molecules interact with the material and induce currents across its surface. A diverse group of materials are candidates for hygroelectric generators, but the most promising option is polymer-based materials.

Hygroelectric materials are an untapped energy source that relies primarily on moisture in the air. Without the need for a costly or hazardous feedstock, these materials offer a clean solution to power generation. Widespread manufacturing of hygroelectric material would reduce the use of fossil fuels and alleviate the reliance on existing alternative energy forms. Existing alternative energy forms are often not as clean as they may appear. Though solar power provides clean energy upon final assembly of panels, the manufacturing process leaves devastating impacts on the communities responsible for the mining of the rare earth metals needed in solar panels. For every ton of harvested rare earth metals, roughly 2,000 tons of toxic waste is produced. Hygroelectric materials could open new avenues for harvesting clean and reliable energy from the natural environment.

Polymer-based hygroelectric material could change the way electronic devices function. Smaller electronic devices requiring small power input could benefit greatly from a continuously charging battery. Devices, such as prosthetics and mobile devices, could be wrapped or coated in the polymer material and never again require external charging. Such a material could change the lives of those who use wearable electronic prosthetics. Never or rarely having to recharge a wearable device would aid users and relieve anxiety associated with battery life. Being able to charge one's mobile device with a few breaths of moist air to the material would eliminate the possibility of a phone battery ever dying. Many other possibilities exist for the implementation of a polymer-based hygroelectric material in our ever-changing society.

Hygroelectric polymers generate power from ambient water vapor striking the surface. Water molecules have a negative charge component in the oxygen molecule, and positive charge components with hydrogen. Hygroelectric polymers contain molecular structures that act as capacitor plates, generating current after a collision with a water molecule. While the power generated is small, light polymers can be stacked and connected. As hygroelectric power output can greatly vary like photovoltaic energy, a charge management system may allow safe charging of a battery, even when under electrical load.

Accordingly, the present invention provides a hygroelectric charging and power management system. The system comprises at least one single layer or a bilayer of flexible hygroelectric polymer stacked together in series to generate power on collision with a water molecule, and at least one rechargeable battery having an input terminal and an output terminal. The input terminal is electrically connected to the at least one single layer or the bilayer of flexible hygroelectric polymer to receive and store the generated power. The system further comprises at least one charger module to modulate between the at least one single layer or the bilayer of flexible hygroelectric polymer and the at least one rechargeable battery. The system applies Pulse Width Modulation (PWM) on the at least one charger module to balance real-time recharging of the at least one battery and to ensure a constant power supply to a device under active load.

In accordance with an embodiment of the present invention, FIG. 1 illustrates a schematic view of the electrical wiring for hygroelectric charging and power management system 100. The figure shows at least one single layer or the bilayer of flexible hygroelectric polymer 110 and a charger module 120 to modulate between the at least one single layer or the bilayer of flexible hygroelectric polymer 110 and the at least one rechargeable battery 130. As an electrical intermediary between the rechargeable battery and the hygroelectric material, the charger module 120 provides a constant voltage. The single or the bilayer of the flexible hygroelectric polymer 110 is selected from a group consisting of polyethylene terephthalate, polyethylene naphthalate, polyimide, and polytetrafluoroethylene. Polyvinylidene fluoride, polyamide, polyvinyl chloride, polydimethylsilane, polystyrene, polyethylene, polyvinylidene chloride, polychloroether, polymethyl methacrylate, polyvinyl alcohol, polyisobutylene, poly Vinyl formal, polyacrylonitrile, polycarbonate, polybutylene terephthalate, polyethylene naphthalate, polydifluorodichloroethylene, p-xylene ring dimer, ethylene vinyl acetate One of a copolymer, a perfluoroethylene-propylene copolymer, an acrylonitrile-butadiene-sty-rene terpolymer, and a vinyl chloride-vinyl acetate copolymer.

In an embodiment, the at least one rechargeable battery 130 is a 3.7V 600 mAh Lithium ion (Li-ion) battery or 3.7V 600 mAh Lithium Polymer (Li—Po) battery. The charger module 120 is a TP5000 PWM charger module. The TP5000 PWM charger module is a 4.2V/3.6V Lithium Ion and Lithium Phosphate Battery Charging Module. The default charging current on this module is 1 A but is adjustable by changing value of current shunt sensing resistor. This charger module 120 also supports simultaneous charging and discharging. This is a charging module for the Lithium Battery (Li-ion or Li—Po) based on the TP5000 battery charging IC. This charger module 120 can charge a recharge-able battery 130 with a current of up to 1 A. This charger module 120 has advance features like battery temperature protection, reverse battery shutdown, and short circuit protection. The charger module 120 comes with a dual-colour led, which is used to denote the charging and full status of the battery. The charger module 120 also serves as a battery protection board; with a built-in automatic recharge function, it will automatically charge the battery when it gets fully discharged. The charger module 120 and the recharge-able battery 130 are positioned inside the device under active load.

In an embodiment, the single layer or a bilayer polymer 110 is a combination of Polystyrenesulfonate (PSS), and Polyvinyl alcohol (PVA). The disclosed system comprises an additional layer of hygroelectric polymer comprising Polydiallyldimethylammonium Chloride (PDDA).

In accordance with an exemplary embodiment of the present invention, FIGS. 2A and 2B illustrate schematic views of placements of hygroelectric material on a drone. The single layer or a bilayer of flexible hygroelectric polymer is applied on a device under active load. The device under active load is a LSRC XT8 mini quadcopter drone. Quadcopters generally have two rotors spinning clockwise (CW) and two counterclockwise (CCW). Flight control is provided by independent variation of the speed and hence lifts and torque of each rotor. Pitch and roll are controlled by varying the net center of thrust, with yaw controlled by varying the net torque. Unlike conventional helicopters, quadcopters do not usually have cyclic pitch control, in which the angle of the blades varies dynamically as they turn around the rotor hub. In the early days of flight, quadcopters (then referred to either as 'quadrotors' or simply as 'heli-copters') were seen as a possible solution to some of the persistent problems in vertical flight. Torque-induced con-trol issues (as well as efficiency issues originating from the tail rotor, which generates no useful lift) can be eliminated by counter-rotation, and the relatively short blades are much easier to construct.

In an exemplary embodiment, as shown in FIGS. 2A and 2B, the single layer or a bilayer of flexible hygroelectric polymer is applied in two different configurations. In the first configuration as illustrated by FIG. 2A, the single layer or a bilayer of flexible hygroelectric polymer is applied across the drone body, and in the second configuration as illustrated by FIG. 2B, streamer-like deployment of the single layer or a bilayer of flexible hygroelectric polymer off the drone body is applied. The wiring remains identical in both the configurations, although both offered specific advantages and disadvantages regarding weight distribution in the craft.

The disclosed hygroelectric charging and battery man-agement system described herein is not limited to drones and can be applied to various other applications. Although a drone is provided as an illustrative example, it should be understood that the use of the disclosed charging system extends beyond this specific embodiment. The disclosed system can be employed in any suitable context where efficient and reliable charging of a device or equipment is desired. Thus, the disclosed system has broad applicability and can be adapted for use in a wide range of electronic devices, machinery, vehicles, or any other applicable fields.

In an embodiment, the system comprises a communica-tion unit in communication with a battery management server configured to compare a state of charge of the rechargeable battery being charged. The communication unit delivers the state of charge information of the rechargeable battery to the battery management server. The system further comprises a control unit that receives the charging profile of the battery from the battery management server and controls charging of the at least one battery based on the received charging profile of the rechargeable battery.

The communication unit may transmit information about a charging and/or discharging state of the rechargeable battery to the battery management server. The battery man-agement server may generate a charging and/or discharging profile of the rechargeable battery based on the received information on the charging and/or discharging state of the rechargeable battery. For example, when battery identifica-tion information is received together with battery charging and/or discharging state information, the battery manage-ment server stores charging and/or discharging profiles of the battery in response to the received battery identification information/or can be transmitted. The battery management server may receive a charging and/or discharging profile of the battery from the communication unit, and may charge and/or discharge the battery based on the received charging and/or discharging profile.

The communication unit may communicate with the battery management system. Also, the communication unit may communicate with a battery management system included in each of at least one rechargeable battery con-nected to the battery charger module.

In one embodiment, the communication unit may be a wireless communication circuit (eg, a cellular communica-tion circuit, a short-distance wireless communication circuit, or a global navigation satellite system (GNSS) communica-tion circuit) or a wired communication circuit (eg, a local area network (LAN) communication circuit), or power line communication circuit), and using the corresponding com-munication circuit, a short-distance communication network such as Bluetooth, WiFi direct or IrDA (infrared data asso-ciation), or a long-distance communication network such as a cellular network, the Internet, or a computer network. Through this, it is possible to communicate with an external electronic device.

Stages of Development and Experimental Data:

Material Synthesis: Two hygroelectric materials were investigated: a single-layered material and a double-layered (bilayer) material. The first hygroelectric material was a combination of polystyrenesulfonate (PSS) and polyvinyl alcohol (PVA). The materials were substantially more expensive than other hygroelectric devices, but utilized to replicate prior work. Both were measured, then placed in a petri dish, and baked at 45 degrees Celsius for 4 hours. Conductive tape was used to connect each sample to positive and negative wire leads. The second material used an additional layer of polydiallyldimethylammonium chloride (PDDA). Further details on the synthesis are included in the Appendix.

Both materials were synthesized in petri dishes of a 90 mm diameter. The resulting average thickness for a single-layer material was approximately 0.145 mm. The average material density was 1.45 g/mL, which was calculated by displacing oil in a graduated cylinder. The differences in density between both materials were negligible, so a constant density was assumed. The total single-layer volume of 0.92 mL or 0.35 cubic cm, and the total mass per single-layer sample was 1.33 g. The relationship between density (ρ), mass (M), and volume (V) is in Equation-1.

$$\rho = \frac{M}{V} \tag{1}$$

The volume of the double-layer sample was 1.36 mL, and the mass per bilayer sample was 1.97 g. With these volumes and measurements, the drone's capabilities would limit its deployment.

Quadcopter drone Coverage: The XT8 drone was foldable for easier transport. The height of the drone is 4 cm. When folded, its dimensions are 8.5 cm by 5.5 cm. When unfolded, the dimensions are 14.5 cm by 11 cm. Folding the drone could cover or interrupt the hygroelectric materials placed on its sides, and landing the drone its belly could have potentially damaged or covered the materials. As such, only the top was used for sample mounting. The total usable area was constrained to 46.75 cm², or 4675 mm².

$$V = lwh \tag{2}$$

Because hygroelectric materials can be folded and stacked, a 3D implementation was modeled as a rectangular prism, as in Equation 2. The material would have length (l), width (w), and height (h). The drone weighed approximately 340 g, with a lifting capability of 20 g. The total volume of complete coverage by the hygroelectric materials was calculated to be 677.9 mL for single-layer material, and 995.8 mL for the bilayered material.

Using Equation 1, the calculated weights for the total coverage were 983 g for the single layered and 1443.9 g for the bilayered material. Because both of these were substantially higher than the lifting capacity, a reduced volume was obtained using Equation 3.

Assuming a constant density (ρ_c) for both materials, the maximum usable volume was limited to 13.8 mL.

$$\rho_c = \frac{M_1}{V_1} = \frac{M_2}{V_2} \tag{3}$$

This value does not include electrodes, tape, adhesive, or other means of securing it, so the final effective usable volume was lower. Single samples were attached to the top of the drone. The calculated maximum volume was almost ten times that of the individual volumes of the single-layered and bilayered samples. It was assumed that a single sample could be secured with electrical tape and wire, without adding excessive weight to the drone.

Active Tests: The hygroelectric samples were evaluated for voltage output with a multimeter. All testing was conducted indoors at a constant relative humidity of 55%. Each voltage measurement was repeated three times, with an averaged voltage over 1 s. The samples were evaluated individually and in series.

Series Measurement of Hygroelectric Samples:

The total voltage in series was the sum of both samples, as shown in Equation 4. The total voltage $V_{total}$ is the sum of the first sample voltage $V_1$ and the second sample voltage $V_2$.

$$V_{total} = V_1 + V_2 \tag{4}$$

When connected, standard wires were secured via carbon electrode tape and wires. A flight test was conducted after the drone was equipped with the fabricated hygroelectric sample with the highest consistent output and the required circuitry. Analysis of variance (ANOVA) was performed on the final dataset.

Results: The average voltages from each individual sample are shown below, in Table 1. The single-layered samples had a lower average voltage than the bilayered samples. The values were also lower than those reported in the literature. The reported values were 1.38 V for a bilayered device, and 0.6 V for a single-layered device.

TABLE 1

| Average voltages for single layered and bilayered samples | | |
|---|---|---|
| | Single Layer Av. (V) | Bilayer Average (V) |
| Individual | 0.002 ± 0.04 | 0.01 ± 0.07 |
| Series | 0.02 ± 0.005 | 0.04 ± 0.01 |

The ANOVA results are shown in Table 2.

| | sum sq | df | F | PR(>F) |
|---|---|---|---|---|
| C(layer) | 0.000867 | 1 | 0.498204 | 0.500324 |
| C(wiring) | 0.000768 | 1 | 0.441316 | 0.525169 |
| C(layer):C(wiring) | 0.000243 | 1 | 0.139635 | 0.718353 |
| Residual | 0.013922 | 8 | NaN | NaN |

(No Significant Changes were Found Between the Observed Values)

Terms and phrases used in this document, and variations thereof, unless otherwise expressly stated, should be construed as open ended as opposed to limiting. As examples of the foregoing: the term "including" should be read as mean "including, without limitation" or the like; the term "example" is used to provide exemplary instances of the item in discussion, not an exhaustive or limiting list thereof; and adjectives such as "conventional," "traditional," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although item, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent.

For the purposes of this specification and appended claims, unless otherwise indicated, all numbers expressing amounts, sizes, dimensions, proportions, shapes, formulations, parameters, percentages, quantities, characteristics, and other numerical values used in the specification and claims, are to be understood as being modified in all instances by the term "about" even though the term "about" may not expressly appear with the value, amount, or range. Accordingly, unless indicated to the contrary, the numerical parameters set forth in the following specification and attached claims are not and need not be exact, but may be approximate and/or larger or smaller as desired, reflecting tolerances, conversion factors, rounding off, measurement error and the like, and other factors known to those of skill in the art depending on the desired properties sought to be obtained by the subject matter of the present invention. For example, the term "about," when referring to a value can be meant to encompass variations of, in some embodiments ±100%, in some embodiments ±50%, in some embodiments ±20%, in some embodiments ±10%, in some embodiments ±5%, in some embodiments ±1%, in some embodiments ±0.5%, and in some embodiments ±0.1% from the specified amount, as such variations are appropriate to perform the disclosed methods or employ the disclosed compositions.

Further, the term "about" when used in connection with one or more numbers or numerical ranges, should be understood to refer to all such numbers, including all numbers in a range and modifies that range by extending the boundaries above and below the numerical values set forth. The recitation of numerical ranges by endpoints includes all numbers, e.g., whole integers, including fractions thereof, subsumed within that range (for example, the recitation of 1 to 5 includes 1, 2, 3, 4, and 5, as well as fractions thereof, e.g., 1.5, 2.25, 3.75, 4.1, and the like) and any range within that range.

All publications, patent applications, patents, and other references mentioned in the specification are indicative of the level of those skilled in the art to which the presently disclosed subject matter pertains. All publications, patent applications, patents, and other references are herein incorporated by reference to the same extent as if each individual publication, patent application, patent, and other reference was specifically and individually indicated to be incorporated by reference. It will be understood that, although a number of patent applications, patents, and other references are referred to herein, such reference does not constitute an admission that any of these documents forms part of the common general knowledge in the art. Although the foregoing subject matter has been described in some detail by way of illustration and example for purposes of clarity of understanding, it will be understood by those skilled in the art that certain changes and modifications can be practiced within the scope of the appended claims.

What is claimed:

1. A hygroelectric charging and battery management system, said system comprises:
a) at least one single layer of flexible hygroelectric polymer stacked together in series to generate power on collision with a water molecule;
b) at least one rechargeable battery having an input terminal and an output terminal, wherein the input terminal is electrically connected to the at least one single layer of flexible hygroelectric polymer, configured to receive and store the generated power; and
c) at least one charger module to modulate between the at least one single layer of flexible hygroelectric polymer and the at least one rechargeable battery, wherein the system applies Pulse Width Modulation (PWM) on the at least one charger module for balancing real-time recharging of the at least one rechargeable battery and to ensure constant power supply to a device under active load.

2. The system as claimed in claim 1, wherein the at least one charger module and the at least one rechargeable battery are positioned inside the device under active load.

3. The system as claimed in claim 1, wherein the at least one single layer of flexible hygroelectric polymer is applied on the device under active load.

4. The system as claimed in claim 1, wherein the at least one charger module is a TP5000 PWM charger module.

5. The system as claimed in claim 1, wherein the device under active load is a LSRC XT8 mini quadcopter drone.

6. The system as claimed in claim 1, wherein the at least one single layer flexible hygroelectric polymer is a combination of Polystyrenesulfonate (PSS), and Polyvinyl alcohol (PVA).

7. The system as claimed in claim 1, comprises an additional layer of hygroelectric polymer comprising Polydiallyldimethylammonium Chloride (PDDA).

8. The system as claimed in claim 1, wherein the system comprises a communication unit in communication with a battery management server configured to compare a state of charge of the at least one rechargeable battery being charged.

9. The system as claimed in claim 1, wherein the communication unit delivers the state of charge information of the at least one rechargeable battery to the battery management server.

10. The system as claimed in claim 1, wherein the at least one rechargeable battery is a 3.7V 600 mAh Lithium ion (Li-ion) battery.

11. The system as claimed in claim 1, wherein the at least one rechargeable battery is a 3.7V 600 mAh Lithium Polymer (Li—Po) battery.

12. A hygroelectric charging and battery management system, said system comprises:
a) at least one bilayer of flexible hygroelectric polymer stacked together in series to generate power on collision with a water molecule;
b) at least one rechargeable battery having an input terminal and an output terminal, wherein the input terminal is electrically connected to the at least one bilayer of flexible hygroelectric polymer, configured to receive and store the generated power; and
c) at least one charger module to modulate between the at least one bilayer of flexible hygroelectric polymer and the at least one rechargeable battery, wherein the system applies Pulse Width Modulation (PWM) on the at least one charger module for balancing real-time recharging of the at least one rechargeable battery and to ensure constant power supply to a device under active load.

13. The system as claimed in claim 12, wherein the at least one bilayer of flexible hygroelectric polymer is applied on the device under active load.

14. The system as claimed in claim 12, wherein the at least one bilayer of flexible hygroelectric polymer is a combination of Polystyrenesulfonate (PSS), and Polyvinyl alcohol (PVA).

* * * * *